United States Patent
Lee

(10) Patent No.: US 8,386,658 B2
(45) Date of Patent: Feb. 26, 2013

(54) COMMUNICATION METHOD OF HOST APPARATUS CAPABLE OF CONNECTING WITH DEVICE BY USING WIRELESS UNIVERSAL SERIAL BUS AND WIRELESS CONNECTION SYSTEM INCLUDING HOST APPARATUS AND DEVICE

(75) Inventor: Jun-seung Lee, Seongnam-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 126 days.

(21) Appl. No.: 12/047,553

(22) Filed: Mar. 13, 2008

(65) Prior Publication Data

US 2008/0301351 A1 Dec. 4, 2008

(30) Foreign Application Priority Data

Jun. 4, 2007 (KR) .............................. 10-2007-54621

(51) Int. Cl.
*G06F 3/00* (2006.01)
*G06F 13/12* (2006.01)
(52) U.S. Cl. ............................... 710/10; 710/62; 710/63
(58) Field of Classification Search ...................... 710/10
See application file for complete search history.

(56) References Cited

U.S. PATENT DOCUMENTS

| 5,890,015 | A | 3/1999 | Garney et al. |
| 6,212,401 | B1* | 4/2001 | Ackley ....................... 455/556.1 |
| 2003/0043771 | A1* | 3/2003 | Mizutani et al. ............. 370/338 |
| 2006/0088022 | A1* | 4/2006 | Hogyoku ..................... 370/349 |
| 2006/0149858 | A1* | 7/2006 | Bhesania et al. .................. 710/5 |
| 2008/0069026 | A1* | 3/2008 | Chan et al. .................... 370/315 |

FOREIGN PATENT DOCUMENTS

| JP | 2004-25590 | | 1/2004 |
| JP | 2006-244057 | | 9/2006 |
| JP | 2007-076187 | | 3/2007 |
| KR | 1020070016622 | | 2/2007 |
| WO | WO 2004063836 | A2 * | 7/2004 |
| WO | 2007/052994 | | 5/2007 |

OTHER PUBLICATIONS

Wireless Universal Serial Bus Specification, May 12, 2005, Revision 1.0, pp. 1, 6, 129, 139.*
Korean Notice of Allowance Issued on Feb. 27, 2012 in KR Patent Application No. 10-2007-0054621.
Chinese Office Action Issued on Mar. 7, 2012 in CN Patent Application No. 200810091125.4.
Office Action issued in Chinese Patent Application No. 200810091125.4 dated Aug. 10, 2012.

* cited by examiner

*Primary Examiner* — Henry Tsai
*Assistant Examiner* — Dean Phan
(74) *Attorney, Agent, or Firm* — Stanzione & Kim, LLP

(57) ABSTRACT

A communication method of a host apparatus capable of connecting with a device by using a Wireless Universal Serial Bus (WUSB) includes operations of receiving a connection request signal from the device to be connected to the host apparatus, according to a determination of whether a request to perform an operation in the device occurs in the host apparatus, selectively responding to the connection request signal to connect the device thereto, and performing data communication with the device to perform the operation. According to the communication method, the host apparatus is connected to the device when the host apparatus uses the device, to improve effective and convenient use of the device.

19 Claims, 4 Drawing Sheets

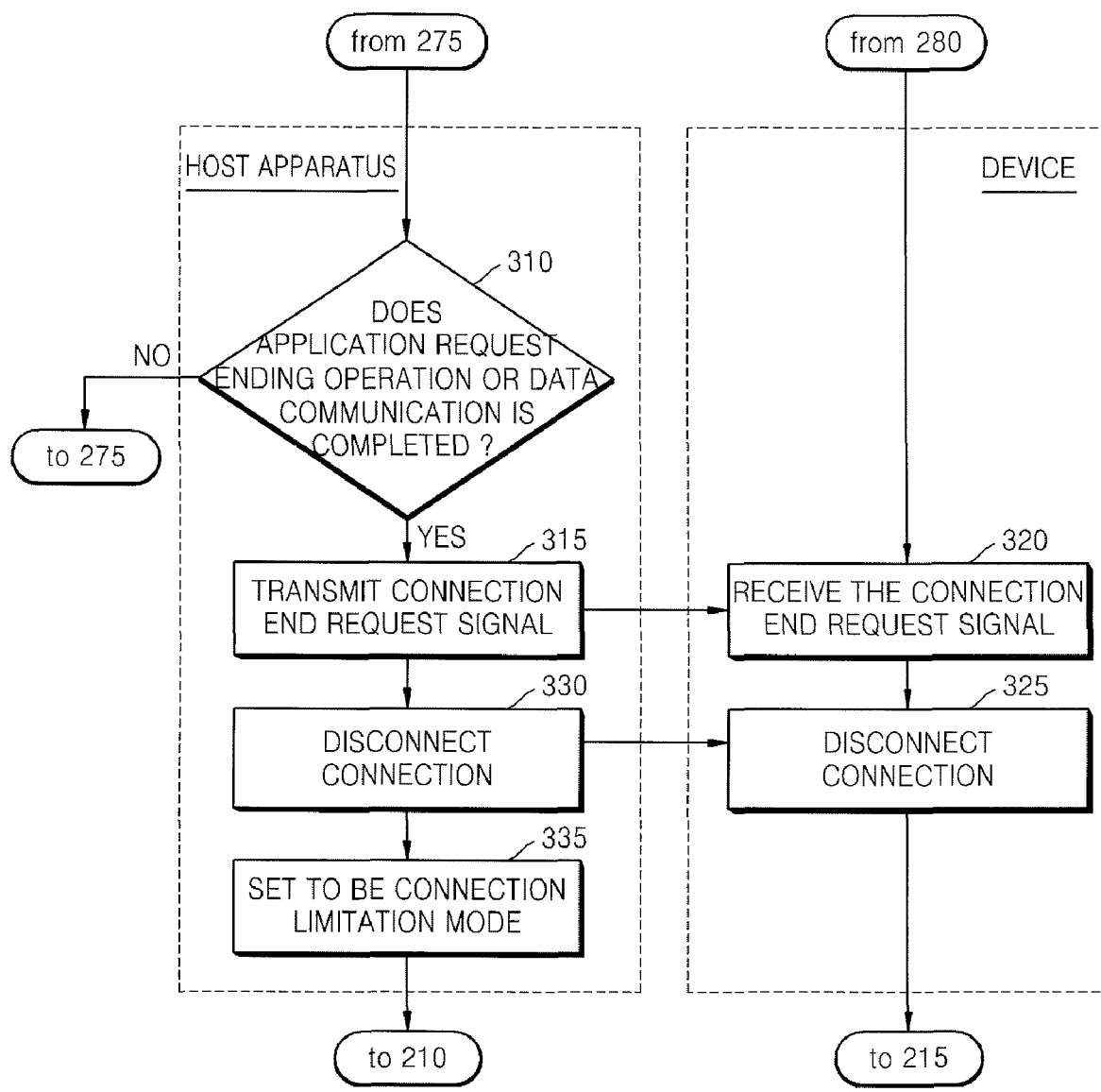

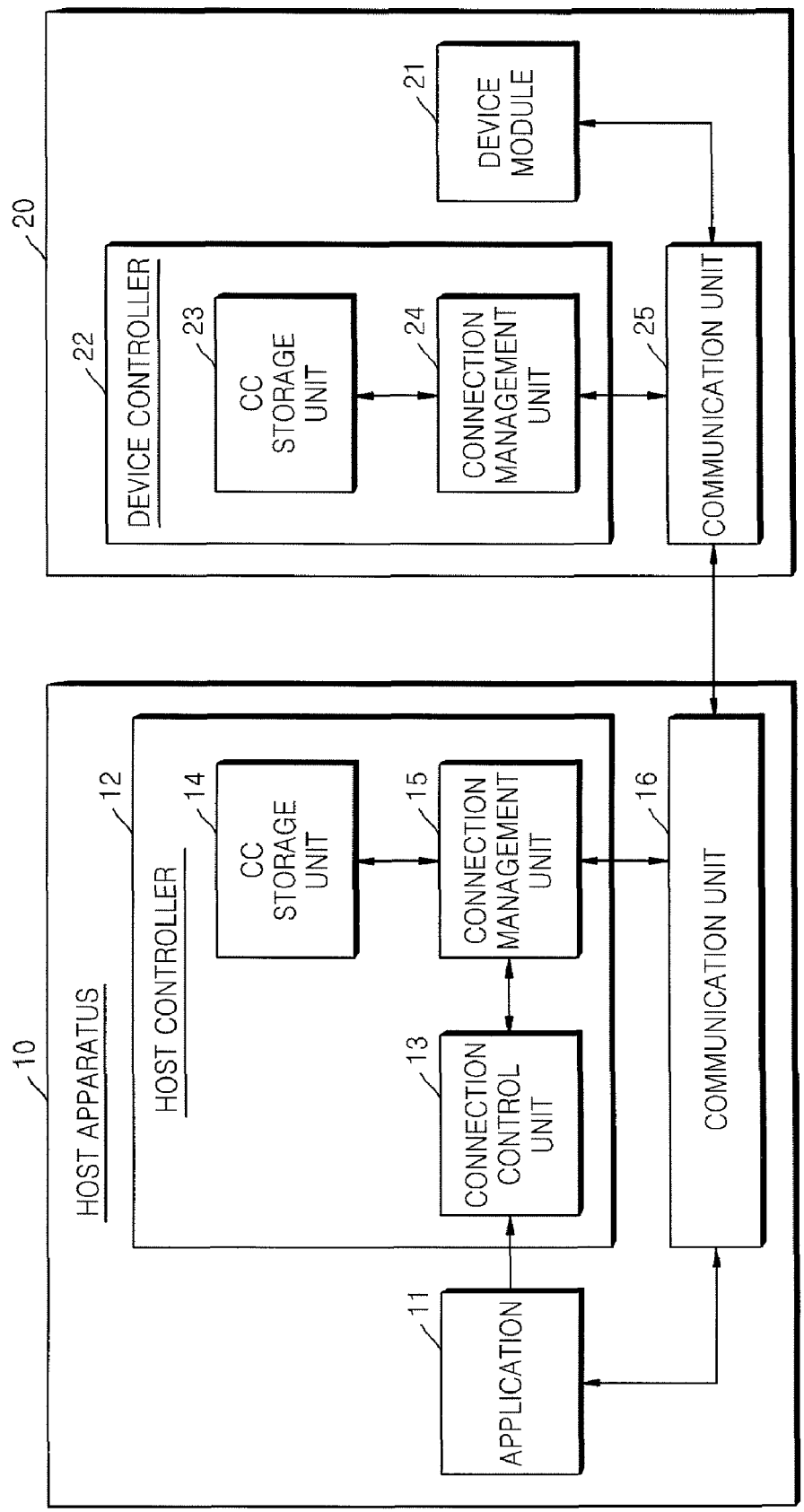

COMMUNICATION METHOD OF HOST APPARATUS CAPABLE OF CONNECTING WITH DEVICE BY USING WIRELESS UNIVERSAL SERIAL BUS AND WIRELESS CONNECTION SYSTEM INCLUDING HOST APPARATUS AND DEVICE

CROSS-REFERENCE TO RELATED APPLICATIONS

This application claims priority under 35 U.S.C. §119(a) from Korean Patent Application No. 10-2007-0054621, filed on Jun. 4, 2007, in the Korean Intellectual Property Office, the disclosure of which is incorporated herein in its entirety by reference.

BACKGROUND OF THE INVENTION

1. Field of the Invention

The present general inventive concept relates to a wireless connection system including a device and a host apparatus capable of mutually connecting with each other by using a Wireless Universal Serial Bus (WUSB), and a communication method of a host apparatus capable of connecting with a device by using the WUSB.

2. Description of the Related Art

A conventional Personal Area Network (PAN) has been developed to change connection technology from wired to wireless technology. According to this change in PAN technology, a Universal Serial Bus (USB) is redefined to a Wireless Universal Serial Bus (WUSB) technology using an Ultra Wide Band (UWB). The WUSB technology using the UWB still maintains the benefits of a conventional USB 2.0, such as a maximum speed of 480 megabytes per second (Mbps), and reinforces a conventional infrastructure so as to provide users with the same benefits as a conventional USB. However, in the case where the WUSB follows a specification of the conventional USB 2.0, some convenient parts of wireless technology are partly overlooked whereby relative conveniences are not provided to users. Technology using the conventional WUSB technology is disclosed in US Patent Laid-Open Publication No. U.S. Pat. No. 5,890,015.

A hub-and-spoke system is applied to topology that is a form of a network for use with the WUSB. In the hub-and-spoke system, a host serving as a hub exists in the center of the system and respective devices serving as spokes exist at each end of the system. The each of the spoke forms a point-to-point connection between the host and the device. One hundred and twenty seven devices can be connected to the host. This is possible since the host does not need physical ports To be connected to the device.

However, the topology overlooks the case where one device is connected to a plurality of hosts. That is, the topology used in the conventional WUSB does not define the case where a specific device is shared with the plurality of hosts so that users have difficulties when the users connect the specific device with the plurality of hosts. For example, in the case where there are several hosts and one device, such as when several computers use one printer, the one device cannot be simultaneously connected with the several hosts. This is inconvenient for the users since they have to connect/disconnect the one device with/from the several hosts like a connection/disconnection method of a wired USB using a cable for connecting/disconnecting.

SUMMARY OF THE INVENTION

The present general inventive concept provides a communication method of a host apparatus capable of connecting with a device by using a Wireless Universal Serial Bus (WUSB). The communication method connects the host apparatus with the device only when the host apparatus uses the device, so as to enable the device to be used efficiently and conveniently in the case of wireless connection where several host apparatuses use one device.

The present general inventive concept also provides a wireless connection system including a device and a host apparatus capable of mutually connecting with each other by using a WUSB. The wireless connection system connects the host apparatus with the device only when the host apparatus uses the device, so as to enable the device to be used efficiently and conveniently in the case of wireless connection where several host apparatuses use one device.

The present general inventive concept also provides a host apparatus capable of connecting with a device by using a WUSB. The host apparatus connects with the device only when the host apparatus uses the device, so as to enable the device to be used efficiently and conveniently in the case of wireless connection where several host apparatuses use one device.

The present general inventive concept also provides a computer readable recording medium having recorded thereon a program for executing a communication method of a host apparatus.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept may be achieved by providing a communication method of a host apparatus capable of connecting with a device by using a WUSB, the communication method including receiving a connection request signal from the device to be connected to the host apparatus, selectively responding to the connection request signal to connect the device, according to whether a request for performing an operation in the device occurs in the host apparatus, and performing data communication with the device to perform the operation.

When the request for performing the operation occurs, the selectively responding to the connection request signal may include setting the host apparatus to respond to the connection request signal, and connecting with the device, in response to the connection request signal.

When the data communication to perform the operation is completed or when a request for ending the operation in the device occurs, the communication method may further include disconnecting from the device.

The communication method may further include setting the host apparatus to not respond to the connection request signal.

While the request for performing the operation does not occur, the host apparatus may be set to not respond to the connection request signal.

Before the performing data communication with the device to perform the operation, the communication method may further include performing an association process with the device and transmitting identification information on the host apparatus to the device.

The communication method may further include mutually performing an authentication procedure on the device.

The request to perform the operation in the device may be made by an application installed in the host apparatus.

The foregoing and/or other aspects and utilities of the present general inventive concept may also be achieved by providing a wireless connection system having a device and a host apparatus capable of mutually connecting by using a WUSB, the wireless connection system including the device to transmit a connection request signal to be connected to the host apparatus, and the host apparatus to selectively respond to the connection request signal, to be connected to the device, and when connected, to perform data communication with the device to perform the operation, according to whether a request for performing an operation in the device occurs.

When the request for performing the operation occurs, the host apparatus may be set to respond to the connection request signal, respond to the connection request signal accordingly, and connect with the device.

When the data communication for performing the operation is completed, or when an application installed in the host apparatus requests the operation to be ended in the device, the host apparatus may disconnect from the device and may be set to not respond to the connection request signal.

While the request for performing the operation does not occur, the host apparatus may be set to not respond to the connection request signal.

The host apparatus may perform an association process with the device and transmit identification information on the host apparatus to the device.

The request for performing the operation in the device may be made by an application installed in the host apparatus.

The foregoing and/or other aspects and utilities of the present general inventive concept may also be achieved by providing a host apparatus capable of connecting with a device by using a WUSB, the host apparatus including: a communication unit receiving a connection request signal from the device for connecting with the device; and according to whether a request for performing an operation in the device occurs, a host controller selectively responding to the connection request signal and connecting with the device.

When the request for performing the operation occurs, the host controller may be set to respond to the connection request signal, respond to the connection request signal accordingly, and connect with the device.

When data communication for performing the operation is completed, or when an application installed in the host apparatus requests the operation to be ended in the device, the host controller may disconnect from the device and may be set to not respond to the connection request signal.

While the request for performing the operation does not occur, the host controller may be set to not respond to the connection request signal.

The foregoing and/or other aspects and utilities of the present general inventive concept may also be achieved by providing a computer-readable medium having recorded thereon a program to execute a communication method.

The foregoing and/or other aspects and utilities of the present general inventive concept may also be achieved by providing a wireless connection system a WUSB, the wireless connection system including a host apparatus not to respond to a connection request signal of an external device to be connected to the device without a request to perform the operation in the device.

The foregoing and/or other aspects and utilities of the present general inventive concept may also be achieved by providing a wireless connection system a WUSB, the wireless connection system including a host apparatus to respond to a connection request signal of an external device to be connected to the device according to a determination of whether a request to perform the operation in the device occurs.

The foregoing and/or other aspects and utilities of the present general inventive concept may also be achieved by providing a wireless connection system a WUSB, the wireless connection system including a device connectable to a host apparatus to output a connection request signal to the host apparatus, and to be connected to the host apparatus according to a request to perform the operation in the device.

The foregoing and/or other aspects and utilities of the present general inventive concept may also be achieved by providing a communication method of a wireless connection system a WUSB, the method including controlling a host apparatus to respond to a connection request signal of an external device to be connected to the device according to a determination of whether a request to perform the operation in the device occurs.

The foregoing and/or other aspects and utilities of the present general inventive concept may also be achieved by providing a computer-readable medium to contain computer-readable codes as a program to execute a communication method of a wireless connection system a WUSB, the method including controlling a host apparatus to respond to a connection request signal of an external device to be connected to the device according to a determination of whether a request to perform the operation in the device occurs.

The foregoing and/or other aspects and utilities of the present general inventive concept may also be achieved by providing a wireless connection system a WUSB, the wireless connection system including device connectable to a plurality of host apparatuses each outputting a connection request signal, and to be connected to one of the host apparatuses having a request to perform the operation in the device The device may not respond the connection request signal of another one of the host apparatus without another request to perform another operation in the device.

The device may not perform a connection with the corresponding host apparatus until the request to perform the operation in the device is generated in the corresponding host apparatus.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which:

FIG. 3 is another flowchart illustrating operations of a host apparatus and a device, according to another embodiment of the present general inventive concept; and FIG. 4 is a block diagram illustrating a host apparatus and a device according to an embodiment of the present general inventive concept.

DETAILED DESCRIPTION OF THE PREFERRED EMBODIMENTS

Figure 1:
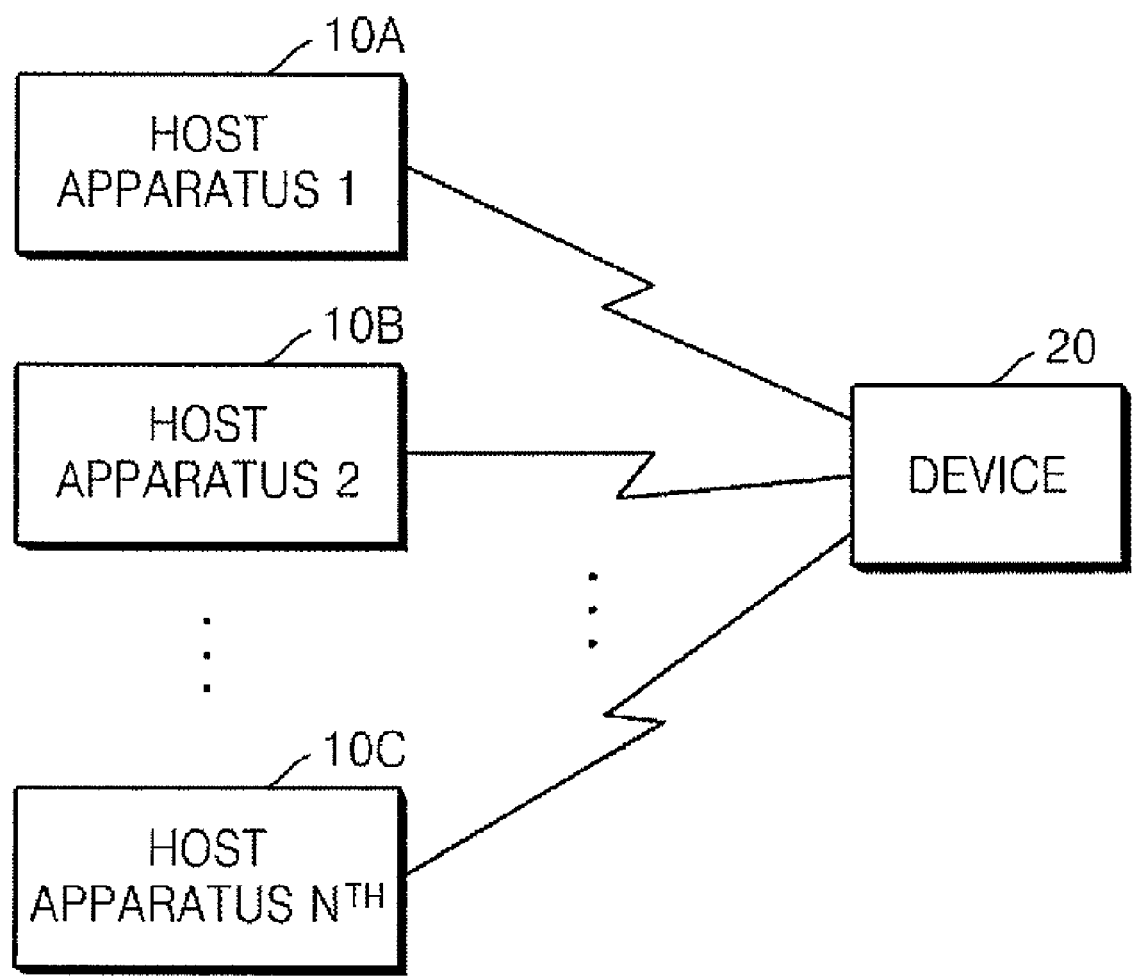
FIG. 1 is a diagram illustrating a wireless connection system including a device and a plurality of host apparatuses according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a diagram illustrating a wireless connection system including a device 20 and a plurality of host apparatuses 10A, 10B, and 10C according to an embodiment of the present invention.

Referring to FIG. 1, each of the plurality of host apparatuses 10A, 10B, and 10C, and the device 20 can be mutually connected to each other by using a Wireless Universal Serial Bus (WUSB). For convenience, only one device 20 is illustrated in FIG. 1. However, in addition to the device 20, one or more other devices capable of mutually connecting with the each of the plurality of host apparatuses 10A, 10B, and 10C may exist in the wireless connection system. Reference numerals for the respective host apparatuses are denoted as 10A, 10B, and 10C in FIG. 1. However, for convenience of description, hereinafter, the reference numerals for the respective host apparatuses are consolidated into 10. In other words, a host apparatus 10 indicates any one of the plurality of host apparatuses 10A, 10B, and 10C illustrated in FIG. 1.

Examples of the host apparatus 10 may be apparatuses including a Personal Computer (PC), a laptop, a workstation or the like which are capable of connecting with the device 20. Examples of the device 20 may be a printer, a multi-function apparatus, or the like. The host apparatus 10 is connectable to the device 20 by using the WUSB and when being connected, communicates with the device 20. When a user requests a predetermined operation, such as printing a document that exists in the host apparatus 10 by using the device 20, the device 20 communicates with the host apparatus 10 and then performs the requested operation such as printing the document.

In order to mutually connect with each other by using the WUSB, the host apparatus 10 and the device 20 pass through an association process that is pre-defined in a WUSB topology specification. At this time, the host apparatus 10 and the device 20 share a connection context including a connection host identification CHID for identifying the host apparatus 10, a connection device identification CDID for identifying the device 20, and a connection key for protected communication. That is, via the association process, the connection context is stored in storage units which are installed in the host apparatus 10 and the device 20, respectively.

After the association process, the host apparatus 10 broadcasts or outputs information including the CHID to the device 20 or other devices (not shown) which exist around or are connectable to the host apparatus 10. The information of the host apparatus 10 is periodically broadcast (or output) at predetermined time intervals.

When the device 20 receives the broadcast information including the CHID, and when the received CHID exists in the connection context stored in the storage unit of the device 20, the device 20 transmits a connection request signal including the CDID and requesting connection with the host apparatus 10, to the host apparatus 10.

When the host apparatus 10 receives the connection request signal including the CDID, and when the received CDID exist in the connection context stored in the storage of the host apparatus 10, the host apparatus 10 responds to the connection request signal. Hereinafter, the host apparatus 10 and the device 20 are assumed to mutually share the connection context after the normal association process. When the host apparatus 10 responds to the connection request signal, the host apparatus 10 and the device 20 mutually connect with each other, and after a mutual authentication procedure, the host apparatus 10 and the device 20 mutually perform data communication. However, according to the present general inventive concept, the host apparatus 10 may be implemented to selectively respond to the connection request signal received from the device 20, as will be described later.

An application unit having an application enabling a user to perform a desired operation by using the device 20 is installed in the host apparatus 10. In the present embodiment, only when the application unit requests an operation to be performed in the device 20, the host apparatus 10 can respond to the connection request signal, connect with the device 20, and then perform data communication to perform the operation. For this purpose, the host apparatus 10 has two modes related to the device 20. The two modes are a connection allowance mode responding to a connection request signal from the device 20, and a connection limitation mode not responding to the connection request signal from the device 20. If a default is set to correspond to a period to control the application unit not to request an operation to be performed in the device 20 as the connection limitation mode related to the device 20, the host apparatus 10 does not respond although the host apparatus 10 receives the connection request signal from the device 20. However, when the application requests an operation to be performed in the device 20, and the host apparatus 10 is set to be in the connection allowance mode in relation to the device 20, the host apparatus 10 responds to the connection request signal received from the device 20, connects with the device 20, and performs data communication for performing the operation.

When the data communication for performing the operation is completed, or when the application requests ending the operation, the host apparatus 10 transmits a connection end request signal for ending the connection, to the device 20, disconnects from the device 20, and then is again set to be in the connection limitation mode related to the device 20. By being set again to be in the connection limitation mode related to the device 20, the host apparatus 10 does not respond to a connection request signal received from the device 20.

Referring to FIG. 1, operations of the plurality of host apparatuses 10A, 10B, and 10C, and the device 20 according to the present general inventive concept are described below.

The plurality of host apparatuses 10A, 10B, and 10C are in the connection limitation mode. However, when one of the plurality of host apparatuses 10A, 10B, and 10C, for example, when the host apparatus 10A, is set to be in the connection allowance mode as described above, the host apparatus 10A responds to a connection request signal from the device 20. Accordingly, the host apparatus 10A and the device 20 connect with each other by using the WUSB, and then mutually perform data communication. Meanwhile, when the device 20 is connected with one of the plurality of host apparatuses 10A, 10B, and 10C, for example, the host apparatus 10A, the device 20 is implemented not to be connected with the other host apparatuses 10B and 10C. For example, when the device 20 is connected with the host apparatus 10A, although the device 20 receives information including the CHID broadcasted from the other host apparatuses 10B and 10C, the device 20 does not transmit a connection request signal from the host apparatuses 10B and 10C.

As described above, when the data communication between the host apparatus 10A and the device 20 for performing the operation is completed, or when the application unit requests ending the operation, the connection between the host apparatus 10A and the device 20 is disconnected, and then the host apparatus 10A is again set to be in the connection limitation mode. After that, when each of the applications installed in the respective host apparatuses 10A, 10B, and 10C requests an operation to be performed in the device 20, each of the host apparatuses 10A, 10B, and 10C connects with the device 20, and mutually performs data communication. Among the plurality of host apparatuses 10A, 10B, and 10C, the one in which the application unit first requests an operation to be performed in the device 20 first responds to a connection request signal received from the device 20 and is connected to the device 20 to mutually perform data communication.

Hereinafter, referring to FIGS. 2 through 3, operations of the host apparatus 10 and the device 20 are described in detail.

Figure 2:
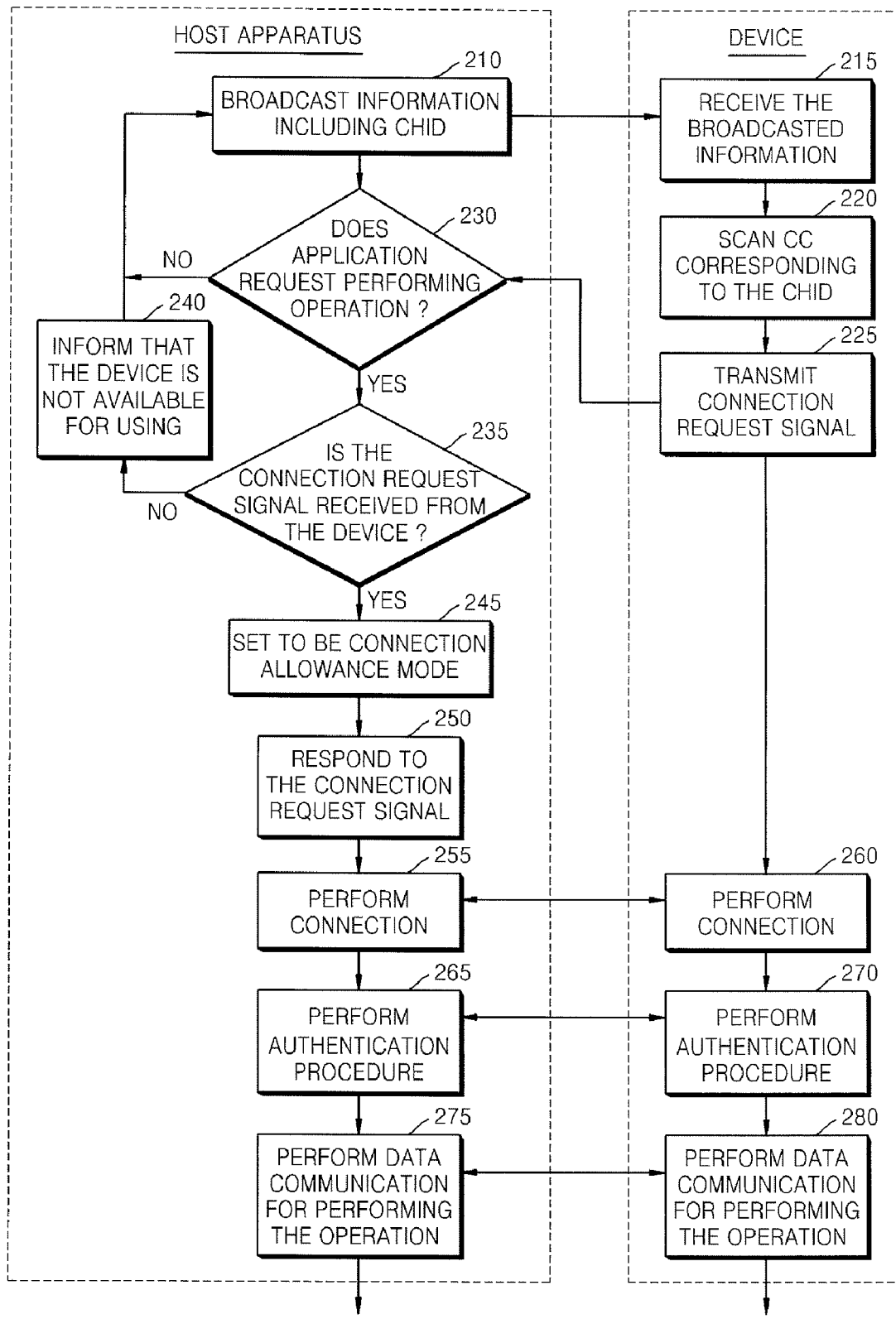
FIG. 2 is a flowchart illustrating operations of a host apparatus and a device according to an embodiment of the present general inventive concept.

FIG. 2 is a flowchart illustrating operations of the host apparatus 10 and the device 20 according to an embodiment of the present general inventive concept. In FIG. 2, the host apparatus 10 is changed from the connection limitation mode to the connection allowance mode. Before operation 210 is performed, the host apparatus 10 and the device 20 are assumed to have already performed the association process defined in the WUSB topology specification. Meanwhile, before operation 210 is performed, the host apparatus 20 in the connection limitation mode does not respond to the connection request signal from the device 20.

In operation 210, the host apparatus 10 broadcasts information including a CHID to the device 20 or other devices (not shown) which exist around or are connectable to the host apparatus 10. In operation 215, the device 20 receives the information broadcast from the host apparatus 10. In operation 220, the device 20 scans a connection context CC corresponding to the CHID included in the received information. In operation 225, the device 20 transmits a connection request signal including a CDID and requesting connection with the host apparatus 10, to the host apparatus 10.

In operation 230, when an application installed in the host apparatus 10 does not request an operation to be performed in the device 20, although the host apparatus 10 receives the connection request signal from the device 20, the host apparatus 10 does not respond to the connection request signal but instead, the host apparatus 10 returns to operation 210, so as to keep broadcasting the information including the CHID.

In operation 230, when an application installed in the host apparatus 10 requests an operation to be performed in the device 20, the host apparatus 10 performs operation 235. In operation 235, when the connection request signal is not received from the device 20 for a predetermined time, the host apparatus 10 performs operation 240. In operation 240, the host apparatus 10 informs a user via a user interface of the host apparatus 10 that the device 20 is not available to perform the operation and/or other operations. Then, the host apparatus 10 returns to operation 210, so as to keep broadcasting the information including the CHID.

In operation 235, when the connection request signal is received from the device 20, the host apparatus 10 performs operation 245 in which the host apparatus 10 is set to be in the connection allowance mode and responds to the connection request signal from the device 20. When the host apparatus 10 is set to be in the connection allowance mode to the device 20 in operation 245, the host apparatus 10 responds to the connection request signal received from the device 20 in operation 250. That is, the host apparatus 10 transmits a signal indicating that a connection with the device 20 is allowed.

When the host apparatus 10 responds to the connection request signal in operation 250, the host apparatus 10 and the device 20 mutually perform connection in operations 255 and 260.

In operations 265 and 270, the host apparatus 10 and the device 20 mutually perform an authentication procedure. At this time, the host apparatus 10 and the device 20 perform a handshake by using a connection key included in the connection context, so as to mutually perform the authentication procedure. The handshake may be a four-way handshake between the host apparatus 10 and the device 20 to perform the authentication process and the data communication process, until the operation is performed and/or until the connection is terminated.

When the authentication procedure is completed in operations 265 and 270, the host apparatus 10 and the device 20 are ready to mutually perform the data communication.

In operations 275 and 280, the host apparatus 10 and the device 20 perform the data communication for performing the operation requested by the application.

FIG. 3 is another flowchart illustrating operations of the host apparatus 10 and the device 20, according to another embodiment of the present general inventive concept. In particular, FIG. 3 illustrates a case where the host apparatus 10 is changed from the connection allowance mode to the connection limitation mode.

In operation 310, when the application unit which has requested an operation to be performed in operation 230 illustrated in FIG. 2 requests ending the operation, or when the data communication performed in operations 275 and 280 illustrated in FIG. 2 are completed, the host apparatus 10 performs operation 315. In operation 315, the host apparatus 10 transmits a connection end request signal to the device 20. In operation 320, the device 20 receives the connection end request signal. In operations 325 and 330, the host apparatus 10 and the device 20 perform a disconnecting process. In operation 335, the host apparatus 10 is again set to be in the connection limitation mode not responding to the connection request signal from the device 20. Accordingly, although the host apparatus 10 receives the connection request signal from the device 20, the host apparatus 10 does not respond to the connection request signal, but instead, the host apparatus 10 returns to operation 210 illustrated in FIG. 2, so as to keep broadcasting information including a CHID.

According to the current embodiment, operation 335 is performed after operation 330. However, the operation of setting the host apparatus 10 in the connection limitation mode may be performed before operation 315 in which the host apparatus 10 transmits the connection end request signal. In other words, after the host apparatus 10 is set in the connection limitation mode, the host apparatus 10 may transmit the connection end request signal to the device 20 so as to perform the disconnecting process.

FIG. 4 is a block diagram illustrating configurations of the host apparatus 10 and the device 20 according to an embodiment of the present general inventive concept.

An application unit 11 having an application enabling a user to perform a desired operation by using the device 20 is installed in the host apparatus 10. The host apparatus 10 includes a host controller 12 and a communication unit 16.

The device 20 includes a device module 21 to perform an operation requested by the host apparatus 10, a device controller 22, and a communication unit 25.

According to a determination of whether the application unit 11 requests the operation to be performed in the device 20, the host controller 12 of the host apparatus 10 selectively responds to a connection request signal from the device 20, and connects with the device 20 by using a WUSB. When the application unit 11 does not request the operation to be performed in the device 20, the host controller 12 is set in a connection limitation mode not to respond to the connection request signal until the operation is requested.

When the application unit 11 requests an operation to be performed in the device 20, the host controller 12 is set to be in a connection allowance mode responding to the connection request signal. Also, when data communication to perform an operation in the device 20 is completed in the communication unit 16, or when the application unit 11 requests ending the operation, the host controller 12 disconnects from the device 20, and is again set in the connection limitation mode.

As illustrated in FIG. 4, the host controller 12 may include a connection control unit 13, a Connection Context (CC) storage unit 14, and a connection management unit 15.

After the host apparatus 10 and the device 20 undergo an association process defined in a WUSB topology specification, a connection context including a connection host identification CHID for identifying the host apparatus 10, a connection device identification CDID for identifying the device 20, and a connection key for secure communication, is stored in the CC storage unit 14 and a CC storage unit 23.

The connection management unit 15 generates a signal indicating information including the CHID of the host apparatus 10, and then broadcasts the signal via the communication unit 16 to the device 20 and other devices (not shown) which exist around or are connectable to the host apparatus 10. Also, the connection management unit 15 responds to a connection request signal from the device 20, generates a signal indicating allowance of connection with the device 20, and then transmits the signal via the communication unit 16. However, according to a control signal of the connection control unit 13, the connection management unit 15 is set to be in the connection allowance mode related to the device 20 or the connection limitation mode to the device 20. Only when the connection management unit 15 is set to be in the connection allowance mode related to the device 20, the connection management unit 15 responds to the connection request signal from the device 20, generates the signal indicating the allowance of connection with the device 20, and the transmits the signal via the communication unit 16.

Meanwhile, besides the device 20 illustrated in FIG. 4, other devices may exist around or be connectable to the host apparatus 10, and the connection management unit 15 may be set to be in the connection allowance mode or the connection limitation mode related to the respective devices. That is, the connection management unit 15 may be set in the connection allowance mode related to the device 20. However, besides the device 20, the connection management unit 15 may be set in the connection limitation mode related to other devices (not illustrated). In a case where the connection management unit 15 is set as described above, the connection management unit 15 responds to the connection request signal from the device 20, but does not respond to connection request signals from the other devices (not illustrated). Also, the connection management unit 15 has information on which devices are set in the connection allowance mode and which devices are set in the connection limitation mode, from among the devices existing around or being connectable to the host apparatus 10.

The connection management unit 15 may determine whether to respond to the connection request signal from each of the devices, by using the CDID of each of the devices. For example, in a case where the connection management unit 15 is set in the connection limitation mode related to the device 20, the connection management unit 15 identifies the device 20 by using the CDID of the device 20, and the CDID included in the connection request signal from the device 20, and the connection management unit 15 may not respond to the connection request signal from the device 20.

Also, the connection management unit 15 responds to the connection request signal from the device 20, transmits the signal indicating that the connection with the device 20 is allowed, connects with the device 20, and then performs an authentication procedure with the device 20. At this time, the connection management unit 15 may perform a handshake by using a connection key included in the connection context, so as to perform the authentication procedure with the device 20. The handshake may be a four-way handshake, for example, between the host apparatus 10 and the device 20 to perform handshakes two time in both ways or four times, for example, to perform the authentication process and the data communication process, until the operation is performed and/or until the connection is terminated According to a request of the application unit 11 to perform or terminate an operation, or according to completion of data communication with the device 20 to perform the operation, the connection control unit 13 outputs a control signal to set the connection management unit 15 to be in the connection allowance mode or the connection limitation mode to the device 20. When the application unit 11 requests the operation to be performed in the device 20 while the connection management unit 15 is in the connection limitation mode, the connection control unit 13 outputs the control signal to set the connection management unit 15 to be in the connection allowance mode to the device 20. While the connection management unit 15 is in the connection allowance mode to the device 20 and is connected with the device 20, when the application unit 11 requests the operation to be ended in the device 20, or when the data communication with the device 20 for performing the operation is completed, the connection management unit 15 generates a connection end request signal to terminate the connection with the device 20, and transmits the connection end request signal via the communication unit 16, so as to disconnect from the device 20. The connection control unit 13 outputs the control signal for setting the connection management unit 15 to be the connection limitation mode to the device 20.

Although the application unit 11 requests an operation to be performed in the device 20, if the connection request signal is not received from the device 20 during a predetermined time, the connection control unit 13 controls a user interface (not illustrated) installed in the host apparatus 10 to inform a user that the device 20 is not available for use.

The communication unit 16 transmits the above described signals generated in the connection management unit 16 to the device 20, and afterwards, when the communication unit 16 is connected with the device 20 by the connection management unit 15, the communication unit 16 performs data communication with the device 20 for performing an operation requested by the application unit 11 of the host apparatus 10.

The device controller 22 includes the CC storage unit 23, and a connection management unit 24. When the connection management unit 24 receives the CHID of the host apparatus 10, the connection management unit 24 generates a connection request signal for connecting with the host apparatus 10, and transmits the connection request signal via the communication unit 25. Also, in response to the connection request signal, when a signal indicating that the connection is allowed, is received from the host apparatus 10, the connection management unit 24 performs the authentication procedure with the host apparatus 10. When the authentication procedure is completed, the connection management unit 24 connects with the host apparatus 10 by using the WUSB.

The communication unit 25 transmits the above described signals generated in the connection management unit 24 to the host apparatus 10. When the communication unit 25 is connected with the host apparatus 10 by the connection management unit 24, the communication unit 25 performs data communication with the host apparatus 10 to perform the operation requested by an application of the host apparatus 10.

According to a determination of whether the application requests an operation to be performed in the device, the host apparatus according to the present embodiment selectively responds to the connection request signal from the device, and connects with the device. Therefore the host apparatus connects with the device only when the host apparatus uses the device. Accordingly, in a case of wireless connection in which several host apparatuses use one device, effective and convenient use of the device is improved.

The embodiments of the present general inventive concept can be written as computer programs and can be implemented in general-use digital computers that execute the programs using a computer readable recording medium. In addition, a data structure used in the embodiments of the present invention can be written in a computer readable recording medium through various means. Examples of the computer readable recording medium include magnetic storage media (e.g., ROM, floppy disks, hard disks, etc.), optical recording media (e.g., CD-ROMs, or DVDs), and storage media such as carrier waves (e.g., transmission through the Internet).

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A communication method of connecting a host apparatus to a device by using a WUSB (Wireless Universal Serial Bus), the communication method comprising:
    performing an association process to enable the host apparatus to communicate with the device via the WUSB by transmitting association information between the host apparatus and the device;
    after performing the association process, receiving a connection request signal from the device to connect the host apparatus to the device;
    determining whether a request occurs in the host apparatus to perform an operation in the device;
    if it is determined that the request to perform an operation occurs, responding to the connection request signal to connect the host apparatus and the device;
    performing data communication with the device to perform the operation;
    when at least one of the data communication to perform the operation is completed and a request to end the operation in the device occurs, disconnecting the host apparatus from the device; and
    after disconnecting the host apparatus from the device, setting the host apparatus to a limited communication mode to not respond to a new connection request signal from the device unless it is determined that another request has occurred in the host apparatus to perform an operation in the device.

2. The communication method of claim 1, wherein the responding to the connection request signal comprises:
    when the request to perform the operation occurs, changing a response mode of the host apparatus to respond to the connection request signal; and
    responding to the connection request signal to connect the host apparatus and the device.

3. The communication method of claim 1, wherein when it is determined that the request has not occurred in the host apparatus to perform an operation in the device, the host apparatus is maintained in a limited communication mode to not respond to the connection request signal.

4. The communication method of claim 1,
    wherein performing the association process includes transmitting identification information from the host apparatus to the device.

5. The communication method of claim 1, wherein the request to perform the operation in the device is made by an application installed in the host apparatus.

6. A non-transitory computer-readable medium to contain computer-readable codes as a program to execute a communication method of a connection system, the method comprising:
    performing an association process to enable a host apparatus to communicate with a device by transmitting association information between the host apparatus and the device;
    after performing the association process, receiving a connection request signal from the device to connect the host apparatus to the device;
    determining whether a request occurs in the host apparatus to perform an operation in the device;
    if it is determined that the request to perform an operation occurs, responding to the connection request signal to connect the host apparatus and the device;
    performing data communication with the device to perform the operation;
    when at least one of the data communication to perform the operation is completed and a request to end the operation in the device occurs, disconnecting the host apparatus from the device; and
    after disconnecting the host apparatus from the device, setting the host apparatus to a limited communication mode to not respond to a new connection request signal from the device unless it is determined that another request has occurred in the host apparatus to perform an operation in the device.

7. A wireless connection system a WUSB, the wireless connection system comprising:
    a device to transmit a connection request signal ; and
    a host apparatus to determine whether a request to perform an operation occurs in the host device, to respond to the connection request signal to be connected to the device when the request to perform the operation occurs, and when connected to the device, to perform data communication with the device to perform the operation,
    wherein when at least one of the data communication to perform the operation is completed and the host apparatus requests the operation to be ended in the device, the host apparatus disconnects from the device and is set to not respond to a new connection request signal unless it is determined that another request has occurred in the host apparatus to perform an operation in the device,
    the host apparatus and the device perform an association process by transmitting association information between the host apparatus and the device to allow the device to communication with the host apparatus,
    the device transmits the connection request signal after completing the association process.

8. The wireless connection system of claim 7, wherein when the request to perform the operation occurs, the host apparatus is set to respond to the connection request signal, responds to the connection request signal accordingly, and connects with the device.

9. The wireless connection system of claim 7, wherein while the request to perform the operation does not occur, the host apparatus is set to not respond to the connection request signal.

10. The wireless connection system of claim 7, wherein the host apparatus performs transmits identification information on the host apparatus to the device during the association process.

11. The wireless connection system of claim 7, wherein the request to perform the operation in the device is made by an application installed in the host apparatus.

12. A host apparatus capable of connecting with a device by using a WUSB, the host apparatus comprising:
- a communication unit to receive a connection request signal from the device to connect with the host apparatus; and
- a host controller to selectively respond to the connection request signal to connect with the device according to a determination of whether a request to perform an operation in the device occurs in the host apparatus,
- wherein when at least one of data communication for performing the operation is completed and the host apparatus requests the operation to be ended in the device, the host controller disconnects from the device and is set to not respond to the connection request signal unless it is determined that another request has occurred in the host apparatus to perform an operation in the device,
- the host apparatus performs an association process with the device to enable the device to communicate with the host apparatus by transmitting association information between the host apparatus and the device,
- the communication unit receives the connection request signal after performing the association process.

13. The host apparatus of claim 12, wherein when the request to perform the operation occurs, the host controller is set to respond to the connection request signal, responds to the connection request signal accordingly, and connects with the device.

14. The host apparatus of claim 12, wherein while the request to perform the operation does not occur, the host controller is set to not respond to the connection request signal.

15. The communication method of claim 1, further comprising:
- mutually performing an authentication procedure on the device.

16. The communication method of claim 1, wherein responding to the connection request includes transmitting a signal from the host to the device prior to performing the data communication with the device to perform the operation.

17. The non-transitory computer-readable medium of claim 6, wherein responding to the connection request includes transmitting a signal from the host to the device prior to performing the data communication with the device to perform the operation.

18. The wireless connection system of claim 7, wherein the host apparatus responds to the connection request by transmitting a signal from the host apparatus to the device prior to performing the data communication with the device to perform the operation.

19. The host apparatus of claim 12, wherein the host controller selectively responds to the connection request by transmitting a signal from the host controller to the device prior to performing a data communication with the device to perform the operation.

* * * * *